United States Patent
Chang et al.

(10) Patent No.: US 7,391,197 B2
(45) Date of Patent: Jun. 24, 2008

(54) APPARATUS FOR REGULATING OUTPUT VOLTAGES WITH A CURRENT CONVERSION MODULE AND ANALOG TO DIGITAL CONVERTER

(75) Inventors: Chia-Shien Chang, Taipei (TW); Chun-An Chao, Taipei (TW)

(73) Assignee: Ali Corporation, Taipei (TW)

( * ) Notice: Subject to any disclaimer, the term of this patent is extended or adjusted under 35 U.S.C. 154(b) by 289 days.

(21) Appl. No.: 11/332,360

(22) Filed: Jan. 17, 2006

(65) Prior Publication Data

US 2007/0069702 A1 Mar. 29, 2007

(30) Foreign Application Priority Data

Sep. 23, 2005 (TW) .............................. 94133206 A

(51) Int. Cl.
*G05F 1/577* (2006.01)
(52) U.S. Cl. ..................... 323/283; 323/267; 323/222
(58) Field of Classification Search ................ 323/283, 323/267, 222, 272, 282, 211, 241, 322
See application file for complete search history.

(56) References Cited

U.S. PATENT DOCUMENTS

| | | | |
|---|---|---|---|
| 6,204,651 B1 * | 3/2001 | Marcus et al. ............... | 323/283 |
| 6,225,792 B1 * | 5/2001 | Blumenkrantz et al. ..... | 323/222 |
| 6,307,336 B1 * | 10/2001 | Goff et al. .................... | 318/254 |
| 6,965,502 B2 * | 11/2005 | Duffy et al. ................... | 361/18 |
| 2005/0270814 A1 * | 12/2005 | Oh .............................. | 363/98 |

\* cited by examiner

*Primary Examiner*—Jeffrey L. Sterrett
*Assistant Examiner*—Harry Behm
(74) *Attorney, Agent, or Firm*—Rosenberg, Kleni & Lee

(57) ABSTRACT

An apparatus for regulating output voltages is used to regulate and output DC voltages, and can output a plurality of DC voltages through a simple structure. The apparatus for regulating output voltages can handle the current mode, and has the function of overcharge protection. The apparatus for regulating output voltages comprises a voltage conversion and comparison module, an analog to digital conversion module, an accumulation module, a pulse generator, a timing generator, a switch module, and an overcharge protection module. The apparatus for regulating output voltages can regulate a plurality of output voltages to provide stable DC power sources required by electronic devices.

14 Claims, 2 Drawing Sheets

APPARATUS FOR REGULATING OUTPUT VOLTAGES WITH A CURRENT CONVERSION MODULE AND ANALOG TO DIGITAL CONVERTER

BACKGROUND OF THE INVENTION

1. Field of the Invention

The present invention relates to an apparatus for regulating output voltages and, more particularly, to an apparatus for regulating and outputting DC voltages.

2. Description of Related Art

An electronic device (e.g., a chip) usually requires at least one DC power source. In consideration of the working voltage and power consumption, several DC sources (e.g., 5V, 3.3V, 2.5V and 1.8V) are usually used. Linear regulators and switch regulators are commonly utilized to generate a plurality of DC voltages. The linear regulators are generally used in situations that require more precise voltages without the need of considering the power consumption. The switch regulators, on the other hand, apply to situations that take power consumption into consideration without the need of precise voltages.

In order to give consideration to both the power consumption and precise voltages, a DC to DC converter is adopted to convert a DC voltage to the required DC voltage. The DC to DC converter, however, requires a plurality of inductors and a plurality of control circuits to achieve a plurality of DC voltage outputs, hence resulting in large chip size and increase of cost.

In order to solve the above problems, U.S. Pat. No. 6,204,651 provides a method and apparatus for regulating output voltages of a switch mode regulator. In the proposed method, a representation of the DC output voltage is first compared with a reference voltage to produce a digital stream of comparison data. The comparison is done at a given clock rate such that the digital stream of comparison data is produced at the corresponding clock rate. The digital stream of comparison data is then interpreted to produce a digital stream of charged data and load data. Next, the digital stream of charge data and load data are interpreted to determine, for a given set of clock cycles, a charge signal and a load signal. Charging of an external element (e.g., an inductor) is enabled in accordance with a charge signal for the given set of clock cycles, and discharging of the external elements to a load (e.g., a capacitor) is also enabled in accordance with the load signal for the given set of clock cycles, accomplishing the function of regulating the output voltages.

The above method, however, cannot handle the current mode. Moreover, the problem of overcharge may arise during the charging process.

SUMMARY OF THE INVENTION

An object of the present invention is to provide an apparatus for regulating output voltages, which is used to regulate and output DC voltages, and can output a plurality of DC voltages through a simple structure. The apparatus for regulating output voltages can handle the current mode, and has the function of overcharge protection.

To achieve the above object, the apparatus for regulating output voltages of the present invention comprises a voltage conversion and comparison module, an analog to digital conversion module, an accumulation module, a pulse generator, a timing generator, a switch module, and an overcharge protection module. The voltage conversion and comparison module is used for conversion and comparison of a DC voltage to be output, and further comprises a voltage to current conversion module and a comparison module. The voltage to current conversion module converts the voltage to a current. The comparison module outputs a plurality of control signals based on the comparison result.

The analog to digital conversion module is connected to the voltage conversion and comparison module, and is used to convert the current output by the voltage conversion and comparison module to digital data. The accumulation module is connected to the analog to digital conversion module, and is used to accumulate and process the number of bits of the digital data output by the analog to digital conversion module. The accumulation module is composed of a proportional integration controller. The pulse generator is connected to the accumulation module, and is used to generate a plurality of pulse signals based on the result of the accumulation module.

The timing generator is connected to the pulse generator and the voltage conversion and comparison module, and is used to generate a plurality of control signals based on the pulse signals generated by the pulse generator and the comparison result of the voltage conversion and comparison module. The switch module is connected to the timing generator, and is used to control charging of a first external energy storage component and discharging of a second external energy storage component based on the control signals generated by the timing generator so as to regulate the DC voltage.

The apparatus for regulating output voltages of the present invention further comprises an overcharge protection module, which is used to stop charging of the charged component when the voltage conversion and comparison module detects the first external energy storage component is overcharged.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
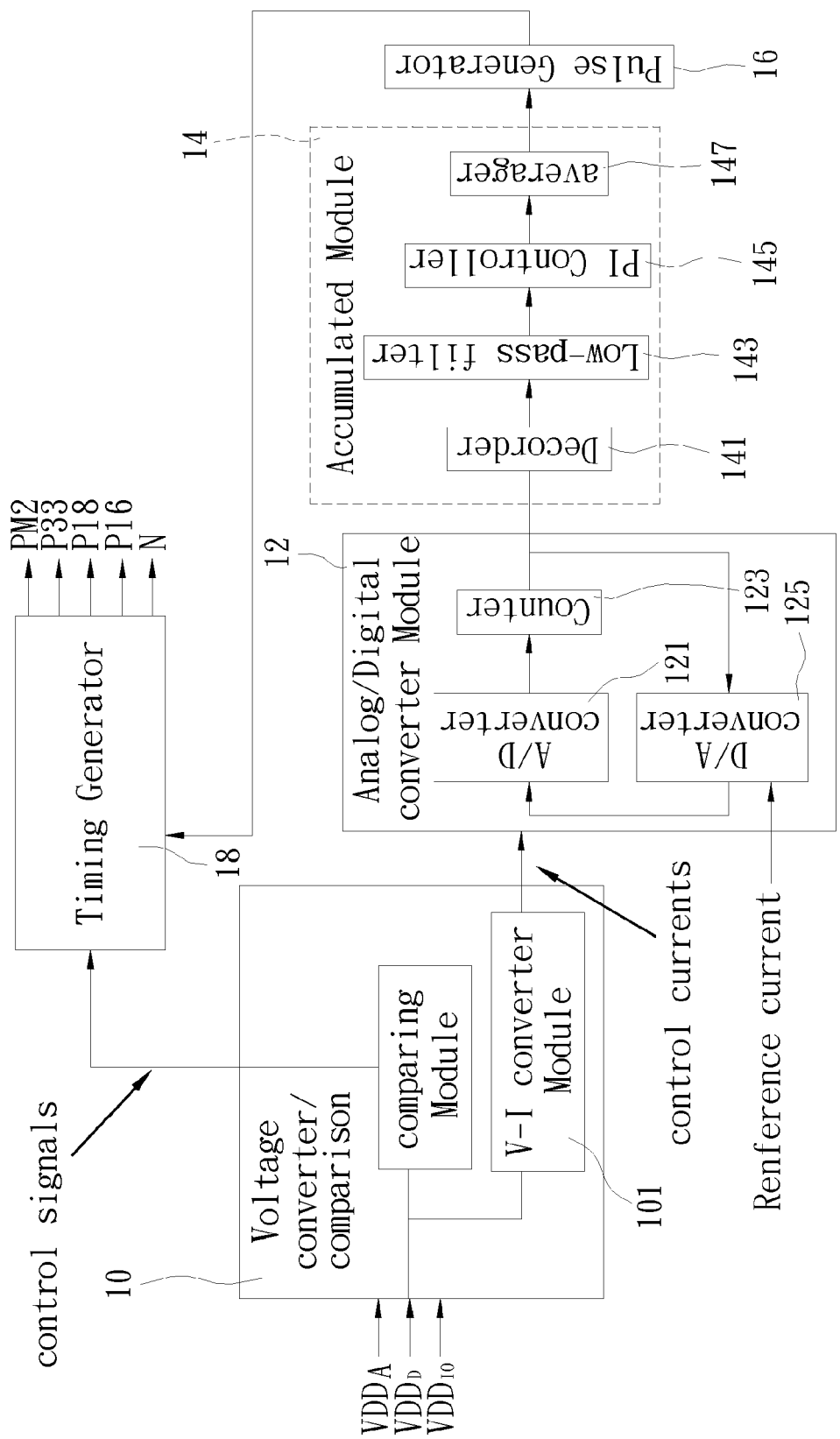
FIG. 1 is a first circuit block diagram of an apparatus for regulating output voltages according to an embodiment of the present invention.
Figure 2:
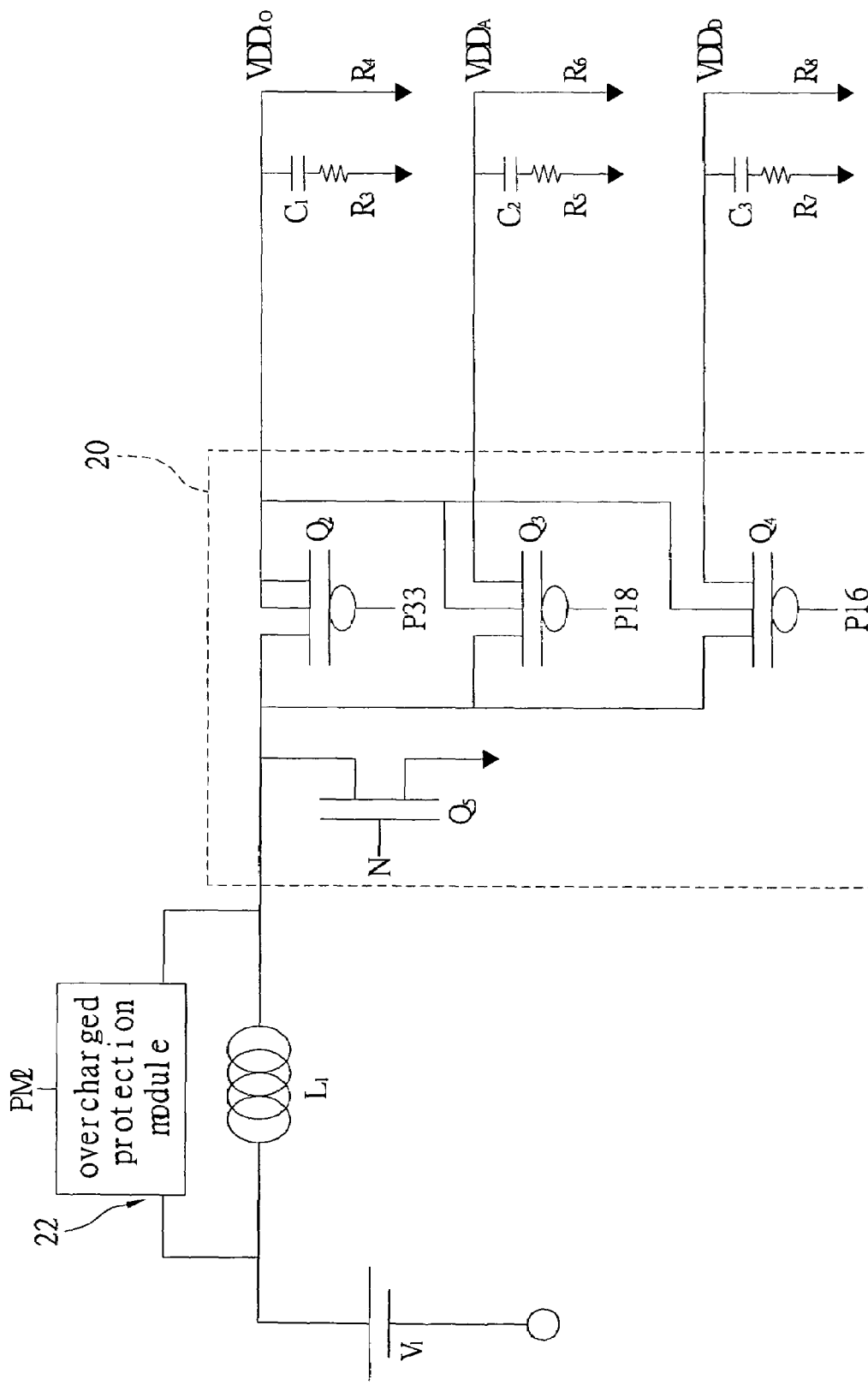
FIG. 2 is a second circuit block diagram of an apparatus for regulating output voltages according to an embodiment of the present invention.

As shown in FIGS. 1 and 2, an apparatus for regulating output voltages of the present invention comprises a voltage conversion and comparison module 10, an analog to digital conversion module 12, an accumulation module 14, a pulse generator 16, a timing generator 18, a switch module 20, and an overcharge protection module 22.

The voltage conversion and comparison module 10 is used for conversion and comparison of a DC voltage to be output, e.g., $VDD_A$, $VDD_D$, and $VDD_{IO}$ shown in the figures. The voltage conversion and comparison module 10 further comprises a voltage to current conversion module 101 and a comparison module 103. The voltage to current conversion module 101 converts voltage to current. The apparatus for regulating output voltages of the present invention can handle the current mode. The comparison module outputs a plurality of control signals to the timing generator 18 according to the comparison result.

The analog to digital conversion module 12 is connected to the voltage conversion and comparison module 10, and is used to convert a current output by the voltage conversion and comparison module 10 to digital data. The analog to digital conversion module 12 comprises an analog to digital converter 121, a counter 123, and a digital to analog converter 125. The analog to digital converter 121 converts the current output by the voltage conversion and comparison module to digital data. The counter is connected to the analog to digital converter 121, and is used to count the digital data output by the analog to digital converter 121. The digital to analog converter 125 is connected to the analog to digital converter 121 and the counter 123, and is used to convert the output of the counter 123 to an analog signal for fast convergence of the converted signal based on a reference current. In these embodiments, the number of bits of the counter 123 is 4. The accumulation module 14 is connected to the analog to digital conversion module 12, and is used to accumulate and process the number of bits of digital data output by the analog to digital conversion module 12. The accumulation module 14 comprises a decoder 141, a low-pass filter 143, a proportional integration (PI) controller 145, and an averager 147. The number of bits of the decoder 141 is 8. The decoder 141 is used to decode the digital signal output by the analog to digital conversion module 12. The number of bits of the low-pass filter is 11. The low-pass filter 143 is connected to the decoder 141, and is used to filter out high frequency noises. The number of bits of the PI controller 145 is 10. The PI controller 145 is connected to the low-pass filter, and is used to accumulate the digital signal. The number of bits of the averager 147 is 3. The averager 147 is connected to the PI controller 145, and is used to adjust the number of bits.

The pulse generator 16 is connected to the accumulation module 14, and is used to generate a plurality of pulse signals according to the accumulation result of the accumulation module 14. The timing generator 18 is connected to the pulse generator 14 and the voltage conversion and comparison module 10, and is used to generate a plurality of control signals according to the pulse signals generated by the pulse generator 14 and the comparison result of the voltage conversion and comparison module 10. These control signals (e.g., PM2, P33, P18, P16 and N shown in the figures) are used to control switching of the switch module 20 and activate the overcharge protection module 22 to accomplish timing control of the charging and discharging processes, thereby stably outputting a plurality of DC voltages. The number of these control signals can be determined based on actual requirements.

The switch module 20 is connected to the timing generator 18, and is used to control switches Q2, Q3, Q4 and Q5 for charging a first external energy storage component L1 and discharging three second external energy storage components C1, C2 and C3 based on the control signals P33, P18, P16 and N generated by the timing generator 18 so as to regulate the DC voltage. The switches Q2, Q3 and Q4 are P-MOS transistors, while the switch Q5 is an N-MOS transistor. The first external energy storage component is an inductor. The second external energy storage components are capacitors. The output DC voltages are obtained by using these control signals P33, P18, P16 and N to activate the charging and discharging timings.

The overcharge protection module 22 is connected to two ends of the first external energy storage component L1, and is used to stop charging of the charged component when the voltage conversion and comparison module 10 detects there is an overcharge situation.

To sum up, the apparatus for regulating output voltages of the present invention has the following characteristics:
1. The apparatus for regulating output voltages can handle the current mode.
2. The apparatus for regulating output voltages has an overcharge protection module to avoid overcharge.
3. The apparatus for regulating output voltages can simultaneously handle a plurality of DC voltages through a simple structure.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. An apparatus for regulating output voltages comprising:
   a voltage conversion and comparison module for converting and comparing of a DC voltage to be output, said voltage conversion and comparison module further comprising a voltage to current conversion module and a comparison module, said voltage to current conversion module converting said voltage to a current, said comparison module outputting a plurality of control signals based on a comparison result;
   an analog to digital conversion module connected to said voltage conversion and comparison module and used to convert said current by said voltage conversion and comparison module to digital data;
   an accumulation module connected to said analog to digital conversion module and used to accumulate and process a number of bits of said digital data output by said analog to digital conversion module;
   a pulse generator connected to said accumulation module and used to generate a plurality of pulse signals based on a result of said accumulation module;
   a timing generator connected to said pulse generator and said voltage conversion and comparison module and used to generate a plurality of control signals based on said pulse signals generated by said pulse generator and said comparison result of said voltage conversion and comparison module; and
   a switch module connected to said timing generator and used to control charging of a first external energy storage component and discharging of a second external energy storage component based on said control signals generated by said timing generator so as to regulate said DC voltage.

2. The apparatus for regulating output voltages as claimed in claim 1, wherein said analog to digital conversion module comprises:
   an analog to digital converter for converting said current output by said voltage conversion and comparison module to digital data;
   a counter connected to said analog to digital converter and used to count said digital data output by said analog to digital converter; and
   a digital to analog converter connected to said analog to digital converter and said counter and used to convert an output of said counter to an analog signal for fast convergence of said converted signal.

3. The apparatus for regulating output voltages as claimed in claim 2, wherein the number of bits of said counter is 4.

4. The apparatus for regulating output voltages as claimed in claim 1, wherein said accumulation module comprises:

a decoder for decoding said digital signal output by said analog to digital conversion module;

a low-pass filter connected to said decoder and used to filter out high frequency noises;

a proportional integration controller connected to said low-pass filter and used to accumulate said digital signal; and an averager connected to said proportional integration controller and used to adjust a number of bits.

5. The apparatus for regulating output voltages as claimed in claim 4, wherein the number of bits of the output of said decoder is 8.

6. The apparatus for regulating output voltages as claimed in claim 4, wherein the number of bits of the output of said low-pass filter is 11.

7. The apparatus for regulating output voltages as claimed in claim 4, wherein the number of bits of the output of said proportional integration controller is 10.

8. The apparatus for regulating output voltages as claimed in claim 4, wherein the number of bits of the output of said averager is 3.

9. The apparatus for regulating output voltages as claimed in claim 1, wherein said switch module is composed of a plurality of P-MOS transistors and at least one N-MOS transistor.

10. The apparatus for regulating output voltages as claimed in claim 1, wherein said first external energy storage component is an inductor.

11. The apparatus for regulating output voltages as claimed in claim 1, wherein said second external energy storage component is a capacitor.

12. The apparatus for regulating output voltages as claimed in claim 1, wherein the number of said first external energy storage component is 1.

13. The apparatus for regulating output voltages as claimed in claim 1, wherein there is a plurality of said second external energy storage components.

14. The apparatus for regulating output voltages as claimed in claim 1, wherein said switch module further comprises an overcharge protection module used to stop charging of said charged component when said voltage conversion and comparison module detects there is an overcharge situation.

* * * * *